United States Patent [19]

Barker et al.

[11] Patent Number: 5,428,104
[45] Date of Patent: Jun. 27, 1995

[54] POLYOL COMPOSITIONS

[75] Inventors: Martin Barker, Everberg; Karen Van Der Sande, Berg, both of Belgium

[73] Assignee: Imperial Chemical Industries PLC, London, England

[21] Appl. No.: 156,198

[22] Filed: Nov. 22, 1993

Related U.S. Application Data

[63] Continuation-in-part of Ser. No. 48,029, Apr. 15, 1993, abandoned.

[51] Int. Cl.$^6$ ............................................. C08G 18/32
[52] U.S. Cl. ............................... 524/795; 252/182.26; 252/182.24; 252/182.27; 521/119; 521/170; 524/871
[58] Field of Search ................ 252/182.24, 182.26, 252/182.27; 524/795, 871; 521/119, 170

[56] References Cited

U.S. PATENT DOCUMENTS

| | | | |
|---|---|---|---|
| 3,996,154 | 12/1976 | Johnson et al. | 252/312 |
| 4,386,032 | 5/1983 | Hughes et al. | 560/351 |
| 4,972,002 | 11/1990 | Volkert | 521/120 |
| 4,981,879 | 1/1991 | Snider | 521/131 |
| 4,997,706 | 3/1991 | Smits et al. | 428/304.4 |
| 5,028,636 | 7/1991 | Gebauer et al. | 521/131 |
| 5,034,424 | 7/1991 | Wenning et al. | 521/109.1 |
| 5,238,970 | 8/1993 | De Vos | 521/114 |

FOREIGN PATENT DOCUMENTS

| | | |
|---|---|---|
| 0031650 | 7/1981 | European Pat. Off. |
| 0498628 | 8/1992 | European Pat. Off. |
| 0508649 | 10/1992 | European Pat. Off. |
| 0565931 | 10/1993 | European Pat. Off. |
| 2312520 | 12/1976 | France. |
| 1445135 | 8/1976 | United Kingdom. |
| 2188055 | 9/1987 | United Kingdom. |

*Primary Examiner*—John Kight, III
*Assistant Examiner*—R. F. Johnson

[57] ABSTRACT

Polyol compositions comprising a polyol, an insoluble fluorinated compound and a surfactant composition which is the reaction product of a stoichiometric excess of a polyisocyanate and a polyalkylene glycol monoalkyl ether of formula R—A—OH, wherein R is $C_{1-25}$ alkyl and A is a polypropylenoxy chain, optionally containing up to 25% polyethylenoxy units, having a total length of from 4 to 39 units.

14 Claims, No Drawings

POLYOL COMPOSITIONS

CROSS REFERENCE TO RELATED APPLICATIONS

This application is a continuation-in-part application of U.S. patent application Ser. No. 08/048,029, filed Apr. 15, 1993, now abandoned, entitled 'Polyol Compositions'.

The present invention is concerned with a novel polyol composition useful in the preparation of rigid polyurethane and/or polyisocyanurate foams, a process for the preparation of such foams and novel surfactant compositions.

Rigid polyurethane and polyisocyanurate foams are in general prepared by reacting the appropriate polyisocyanate and polyol in the presence of a blowing agent. One use of such foams is as a thermal insulation medium as for example in the construction of refrigerated storage devices. The thermal insulating properties of rigid foams are dependent upon a number of factors including, for closed cell rigid foams, the cell size and the thermal conductivity of the contents of the cells. The use of fluorinated compounds which are insoluble or poorly soluble in the polyol or polyisocyanate components of certain foam compositions and which lead to rigid foams having reduced cell size and improved thermal insulation properties is disclosed in U.S. Pat. Nos. 4,981,879, 5,034,424, 4,972,002 and the Applicant's co-pending European Patent Applications No. 0508649 and No. 0498628. The insoluble fluorinated compounds disclosed in these references may be either blowing or non-blowing depending upon the usual factors such as the boiling point of the compound and the conditions employed for the preparation of the foam material. In some cases it is believed that the inert, insoluble, non-blowing liquid acts as a nucleating agent for the volatilisation of the blowing agent or agents (which may include the insoluble fluorinated compound itself). In all cases, the even and extensive distribution of the insoluble fluorinated compound in the foam composition leads to a fine cellular structure within the foam, thereby improving the thermal insulation properties.

The insoluble, fluorinated compounds described in the prior art references may be introduced into the foam composition as additives in either the polyisocyanate or the polyol component. In view of the insoluble nature of the liquid additive, it is desirable to incorporate a surfactant material into the blend to ensure storage stability of the blend and to ensure a high level of dispersion of the liquid in the foam composition and consequential fine-cell structure of the rigid foam. U.S. Pat. Nos. 4,981,879, 5,034,424, 4,972,002 and the Applicant's co-pending European Patent Application No. 0508649 and. No 0498628 describe particularly the use of fluorinated emulsifiers such as oligomeric acrylates containing polyoxyalkylene and fluoroalkane sidechains, fluorinated alkylpolyoxyethylene ethanols, fluorinated alkylalkoxylates and fluorinated alkyl esters, inorganic or inorganic-based emulsifiers such as silica gel or copolymers of silicone, ethylene oxide and/or propylene oxide, and other standard surfactant materials known in the art.

The use of surfactant compositions derived from the reaction of alkoxylated monohydric alkyl alcohols and polyisocyanates has been previously disclosed. U.S. Pat. No. 5028636 describes the preparation of certain urethane-modified polyisocyanate compositions, useful in the preparation of fine-celled foams in the presence of "alternative" blowing agents, i.e. blowing agents other than chlorofluorocarbons. UK Patent Application No 1445135, U.S. Pat. No. 3,996,154 and European Patent Application No 0031650 disclose the use of such surfactant compositions in the preparation of polyisocyanate compositions which are stable to storage or which can be emulsified with water. Their use in the context of emulsifying blends of polyols and insoluble fluorinated compounds has not been hitherto suggested.

Further investigation by the Applicants has led to the development of surfactant compositions derived from the reaction of certain monohydric alkoxylated alcohols and polyisocyanates which are particularly suitable for use as an emulsifier for blends of polyols and insoluble fluorinated compounds. The surfactant compositions of the present invention offer a number of advantages over those described in the prior art for the emulsification of insoluble fluorinated compounds. In particular they provide improved compatibility with blowing agents over silicone surfactants and provide improved storage stability over emulsions produced using fluorinated surfactant materials, in comparison with which they are also considerably cheaper due to the lower cost of the raw materials and processes used for their preparation. Of most importance is their suitability for the preparation of concentrated emulsions of insoluble fluorinated compounds in polyols which show exceptional storage stability and can be readily introduced into full polyol blends at the point of foam preparation, thereby providing easy, reliable and consistent emulsification of the insoluble fluorinated compounds in the polyol component of a rigid foam reaction mix at the point of manufacture.

Accordingly the invention provides a polyol composition comprising a polyol, an insoluble fluorinated compound and a surfactant composition, characterised in that the surfactant composition is the reaction product of a stoichiometric excess of a polyisocyanate and a polyalkylene glycol monoalkyl ether of formula R—A—OH, wherein R is $C_{1-25}$ alkyl and A is a polypropyleneoxy chain, optionally containing up to 25% polyethyleneoxy units, having a total chain length of from 4 to 39 units. The term 'alkyl' as used herein is to be understood to include within its meaning both straight and branched chain variants.

The term "insoluble" as applied to the insoluble fluorinated compound used in the compositions and other aspects of this invention is defined as showing a solubility in the polyol with which it is to be blended of less than 500 ppm by weight at 25° C. and atmospheric pressure.

Insoluble fluorinated compounds for use in the compositions according to the invention include any of those disclosed in U.S. Pat. Nos. 4,981,879, 5,034,424, 4,972,002 and European Patent Application No 0508649 and No 0498628. It is preferred, however, to use an insoluble, substantially fluorinated or perfluorinated compound having a boiling point of at least 40° C. at atmospheric pressure, and preferably at least 60° C., and more preferably at least 80° C. or 100° C. Suitable compounds include substantially fluorinated or perfluorinated hydrocarbons, substantially fluorinated or perfluorinated ethers, substantially fluorinated or perfluorinated tertiary amines, substantially fluorinated or perfluorinated amino-ethers and substantially fluorinated or perfluorinated sulphones.

Suitable examples of substantially fluorinated and perfluorinated hydrocarbons are those containing from 1 to 15 carbon atoms, which may be either cyclic or acyclic, either aromatic or aliphatic and either saturated or unsaturated, such as substantially fluorinated and perfluorinatedmethane, ethane, propane, butane, pentane, hexane, heptane, octane, nonane, decane, cyclobutane, cyclooctane, cyclohexane, cyclopentane, norbornadiene, decaline, dimethylcyclohexane, methylcyclohexane, 1-methyldecaline, phenanthrene, dimethylcyclobutane, and isomers thereof. Particular mention may be made of perfluoro-n-pentane and perfluoro-n-hexane.

Suitable examples of substantially fluorinated or perfluorinated ethers are those containing from 2 to 15 carbon atoms, which may be cyclic or acyclic, such as substantially fluorinated or perfluorinated dialkyl ethers and alkyl substituted cyclic ethers. Particular mention may be made of perfluorinated methyl ethyl ether, perfluorinated methyl propyl ether, the perfluorinated alkyltetrahydropyrans such as perfluorinated propyltetrahydropyran, and the perfluorinated alkyltetrahydrofurans such as perfluorinated propyltetrahydrofuran and perfluorinated butyltetrahydrofuran. Additional examples of substantially fluorinated or perfluorinated ethers which are suitable for use in the process of the invention are the commercially available fluorinated polyethers such as Galden HT 100, HT 200, HT 230, HT 250 and HT 270 available from Montefluos SpA (Galden is a Trade Mark).

Suitable examples of substantially fluorinated or perfluorinated amines are tertiary amines containing from 3 to 15 carbon atoms, which may be cyclic or acyclic, such as substantially fluorinated or perfluorinated trialkylamines, N-alkylated cyclic amines, tetraalkylhydrazines and trialkylhydroxylamines. Particular mention may be made of substantially fluorinated or perfluorinated trimethylamine, triethylamine, ethyldimethylamine, methyldiethylamine, tripropylamine, tributylamine, tripentylamine, tetramethylhydrazine, trimethylhydroxylamine, 0-ethyl dimethylhydroxylamine, 0,0'-bis-(dialkylamino)propylene-glycol, 0,0'-bis-(dialkylamino)ethyleneglycol, N-methyl-pyrrolidine and the N-alkylpiperidines such as N-methylpiperidine.

Suitable examples of substantially fluorinated or perfluorinated aminoethers include those having from 3 to 15 carbon atoms, which may be cyclic or acyclic, such as substantially fluorinated or perfluorinated trialkylethanolamines and N-alkylmorpholines. Particular mention may be made of substantially fluorinated or perfluorinated trimethylethanolamines and N-($C_{1-6}$ alkyl)-morpholines such as N-methyl, N-ethyl and N-isopropylmorpholine.

Suitable examples of substantially fluorinated or perfluorinated sulphones include perfluorinated dialkylsulphones having from 2 to 8 carbon atoms such as perfluoro-(dimethylsulphone) and perfluoro-(methyldiethylsulphone).

The terms substantially fluorinated or perfluorinated as used herein with reference to the insoluble fluorinated compound comprised in the polyol compositions according to the invention are to be understood to embrace compounds in which from 75% to 100% of the hydrogen atoms of the unfluorinated compounds are replaced by fluorine.

polyol compositions according to the invention may comprise a single insoluble fluorinated compound as described herein or a mixture of two or more thereof. Preferably the compound or mixture is liquid at ambient temperatures and more preferably also under the foam forming conditions to be employed.

The surfactant compositions comprised in the polyol compositions according to the invention suitably have an isocyanate value within the range from 5 to 30, and preferably from 10 to 25, prior to their incorporation into the polyol compositions. They are prepared by reaction of a stoichiometric excess of a polyisocyanate and a polyalkylene glycol monoalkyl ether of formula R—A—OH, wherein R is $C_{1-25}$ alkyl (which may be straight or branched) and A is a polypropyleneoxy chain, optionally containing up to 25% polyethyleneoxy units, having a total chain length of from 4 to 39 units. The reaction is preferably carried out by addition of the polyalkylene glycol monoalkyl ether to the polyisocyanate at a temperature above the ambient, suitably within the range from 60° C. to 90° C., followed by a period of mixing at this elevated temperature to ensure complete reaction. The water content of the polyalkylene glycol monalkyl ether should be low, and preferably below 0.05%. The polyisocyanate may be any organic polyisocyanate. Suitable materials include aromatic diisocyanates such as diphenylmethane diisocyanate in the form of its 2,4'- and 4,4'-isomers and mixtures thereof, toluene diisocyanate in the form of its 2,4- and 2,6-isomers and mixtures thereof, 1,5-naphthalene diisocyanate and 1,4-diisocyanatobenzene, aliphatic diisocyanates such as isophorone diisocyanate, 1,6-diisocyanatohexane and 4,4'-diisocyanato dicyclohexylmethane. Polyisocyanates of particular importance for the preparation of the surfactant compositions are the mixtures of diphenylmethane diisocyanates (MDI) and oligomers thereof known in the art as "crude" or polymeric MDI (polymethylene polyphenylene polyisocyanates) having an isocyanate functionality of greater than 2, and their biuret and uretonimine modified derivatives.

Preferred polyalkylene glycol monoalkyl ethers for use in the preparation of the present surfactant compositions are; those wherein the sum of the length of the alkyl chain of R and the length of the polypropylenoxy chain of A is between 5 and 40, preferably between 10 and 30 and most preferably between 20 and 30.

Preferably A represents a polypropylenoxy chain containing no polyethylenoxy units.

Preferred polyalkylene glycol monoalkyl ethers for use in the preparation of the surfactant compositions are those of formula R—A—OH wherein R is $C_{8-22}$ alkyl (which may be straight or branched) and A represents a polypropyleneoxy chain containing from 5 to 20 propyleneoxy units. Particular mention may be made of the polypropylene glycol monoalkyl ethers derived by propoxylation of stearyl alcohol, for example that containing an average of 10 propyleneoxy units, available from Imperial Chemical Industries PLC under the registered trade mark Arlamol E.

The presence of a small amount of water in the polyol compositions according to the invention has been found to promote emulsification and lead to the most stable compositions. In a preferred aspect of the invention, therefore, the polyol compositions according to the invention additionally comprise from 0.5% to 5% by weight of water.

The polyol compositions according to the invention suitably comprise from 0.1 to 60% by weight of the insoluble fluorinated compound, and from 0.05% to 20% by weight of the surfactant composition as hereinbefore defined. Those polyol compositions containing proportions of the insoluble fluorinated compound and the surfactant composition which are at the lower end of the ranges given above are suitable for direct reaction with polyisocyanates under foam forming conditions for the production of polyurethane foams. In a preferred aspect of the invention, however, the polyol composition of the invention is prepared as an emulsion concentrate having excellent storage stability and suitable for blending with one or more further polyol components, which may be the same as or different from the polyol or polyols in the emulsion concentrate, and with other components of the foam reaction system immediately prior to the preparation of the foam.

Polyol compositions according to the invention suitable for such use as emulsion concentrates may suitably comprise from 5 to 60% by weight of the insoluble fluorinated compound and from 0.25% to 20% by weight of the surfactant composition. In a preferred aspect, such emulsion concentrates may also contain from 0.5 to 5% by weight of water.

All proportions of the components of the polyol compositions expressed herein as % by weight are based on the whole polyol composition, the remainder of the composition comprising the polyol component itself together with any further additives which may optionally be present, such as blowing agents, catalysts and additional surfactant materials commonly utilised in the preparation of rigid polyurethane foams.

In principle any polyol or polyol mixture of use in the preparation of polyurethane and urethane-modified polyisocyanurate foams may be used as the polyol component in the polyol compositions according to the invention.

Polyols or polyol mixtures used for preparing rigid foams in general have average hydroxyl numbers of from 300 to 1000, especially from 300 to 700 mg KOH/g, and hydroxyl functionalities of from 2 to 8, especially from 3 to 8.

Suitable polyols have been fully described in the prior art and include reaction products of alkylene oxides, for example ethylene oxide and/or propylene oxide, with initiators containing from 2 to 8 active hydrogen atoms per molecule. Suitable initiators include polyols, for example glycerol, trimethylolpropane, triethanolamine, pentaerythritol, sorbitol and sucrose, and polyamines, for example ethylene diamine, tolylene diamine, diaminodiphenylmethane and polymethylene polyphenylene polyamines, and aminoalcohols, for example ethanolamine and diethanolamine, and mixtures of such initiators. Other suitable polymeric polyols include polyesters obtained by the condensation of appropriate proportions of glycols and higher functionality polyols with dicarboxylic or polycarboxylic acids.

Still further suitable polymeric polyols include hydroxyl terminated polythioethers, polyamides, polyesteramides, polycarbonates, polyacetals, polyolefins and polysiloxanes.

The polyol compositions of the invention may be used in the preparation of rigid polyurethane or polyisocyanurate foams by reaction with any of the polyisocyanates commonly used in the art, in the presence of a blowing agent and optionally in the presence of other components such as surfactants and catalysts which are commonly used in the art. Accordingly, in a further aspect, the invention provides a process for the preparation of a rigid polyurethane or polyisocyanurate foam which comprises reaction of a polyol composition and a polyisocyanate under foam-forming conditions, wherein the polyol composition comprises a polyol, an insoluble fluorinated compound and a surfactant composition, characterised in that the surfactant composition is the reaction product of a stoichiometric excess of a polyisocyanate and a polyalkylene glycol monoalkyl ether of formula R—A—OH, wherein R is $C_{1-25}$ alkyl and A is a polypropyleneoxy chain, optionally containing up to 25% polyethyleneoxyunits, having a total chain length of from 4 to 39 units. In a preferred aspect, the invention provides a process as described herein in which the polyol composition further comprises from 0.5 to 5% by weight of water based on the polyol composition.

Polyisocyanates which may be used in the process for rigid foam preparation according to the present invention include aliphatic, cycloaliphatic, araliphatic and aromatic polyisocyanates as proposed in the literature for use generally in the production of rigid foams. Of particular importance are aromatic diisocyanates such as tolylene and diphenylmethane diisocyanate in the well known pure, modified and crude forms, in particular the so-called MDI variants (diphenylmethane diisocyanate modified by the introduction of urethane, allophanate, urea, biuret, carbodiimide, uretonimine or isocyanurate residues) and the mixtures of diphenylmethane diisocyanate(s) and oligomers thereof known in the art as "crude" or "polymeric" MDI (poly/methylene polyphenylene polyisocyanates). Preferred polyisocyanates are those having an average nominal functionality of 2.4–3.0 and in particular of 2.4–2.9.

Suitable blowing agents for use in the process for rigid foam preparation of the present invention include water or other carbon dioxide—evolving compounds, or inert low boiling compounds having a boiling point of above—70° C. at atmospheric pressure.

Where water is used as blowing agent, the amount may be selected in known manner to provide foams of the desired density, typical amounts being in the range from 0.05 to 5% by weight based on the total reaction system.

Suitable inert blowing agents, include those well known and described in the art, for example hydrocarbons, dialkyl ethers, alkyl alkanoates, aliphatic and cycloaliphatic hydrofluorocarbons, hydrochlorofluorocarbons, chlorofluorocarbons, hydrochlorocarbons and fluorine-containing ethers. Suitable hydrocarbon blowing agents include lower aliphatic or cyclic hydrocarbons such as pentane, iso-pentane, cyclopentane or neopentane, hexane, cyclohexane.

Suitable dialkyl ethers to be used as blowing agents include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropylether, methyl butyl ether, methyl isobutyl ether, methyl t-butyl ether, ethyl butyl ether, ethyl isobutyl ether, and ethyl t-butyl ether.

Suitable alkyl alkanoates which may be used as blowing agents include methyl formate, methyl ace sate, ethyl formate and ethyl acetate.

Suitable hydrofluorocarbons which may be used as blowing agents include lower hydrofluoroalkanes, for example 1,2-difluoroethane, 1,1,1,4,4,4-hexafluorobutane, pentafluoroethane, 1,1,1,2-tetra-fluoroethane and 1,1,2,2-tetrafluoroethane.

Suitable hydrochlorofluorocarbons which may be used as blowing agents include chlorodifluoromethane, 1,1-dichloro-2,2,2-trifluoromethane, 1,1-dichloro-1-fluoroethane, 1-chloro-1,1-difluoroethane, 1-chloro-1-fluoroethane, 1-chloro-2-fluoroethane, and 1,1,1,2-tetrafluoro-2-chloroethane.

Suitable chlorofluorocarbons which may be used as blowing agents include trichlorofluoromethane, dichlorodifluoromethane, trichlorotrifluoroethane and tetrafluorodichloroethane.

Suitable hydrochlorocarbons which may be used as blowing agents include 1- and 2-chloropropane.

Suitable fluorine-containing ethers which may be used as blowing agents include: $CF_3OCF_3$, $CF_3OCF_2H$, $CH_3OCH_2F$, $CF_3OCH_3$, $CF_2HOCF_2H$, $CF_2HOCH_2F$, $CF_2HOCH_3$, $CH_2FOCH_2F$, $CH_2FOCH_3$, $CF_3CH_2OCF_2H$, $CF_3CF_2OCF_3$, $CHF_2CF_2OCF_2H$, $CF_3CHFOCF_2H$, $CF_2HCHFOCF_2H$, $CH_2CF_2OCH_3$, $(CF_3)_2CHOCH_2F$.

Preferred blowing agents for use in the process of the present invention are those having boiling points between $-70°$ C. and $+15°$ C. at atmospheric pressure, and more preferably between $-70°$ C. and $+5°$ C. at atmospheric pressure.

Examples of preferred gaseous blowing agents for use in the process of the present invention include $CHClF_2$, $CH_2F_2$, $CF_3CH_2F$, $CF_2HCF_2H$, $CH_3CClF_2$, $C_2H_4F_2$, $C_2HF_5$, $C_2HClF_4$ and mixtures thereof.

Certain insoluble fluorinated compounds suitable for use in the polyol compositions and in the process of the invention may themselves act as blowing agents under the conditions pertaining to the foam forming reaction, particularly where their boiling point is lower than the exotherm temperature achieved by the reaction mixture. For the avoidance of doubt, such materials may, partly or completely, fulfil the function of blowing agent in addition to that of insoluble fluorinated compound.

The total quantity of blowing agent to be used in a reaction system for producing cellular polymeric materials will be readily determined by those skilled in the art, but will typically be from 2 to 25% by weight based on the total reaction system.

In addition to the polyisocyanate and polyol compositions, and the blowing agent, the foam-forming reaction mixture will commonly contain one or more other auxiliaries or additives conventional to formulations for the production of rigid polyurethane foams.

Such optional additives include crosslinking agents, for example low molecular weight polyols such as triethanolamine, foam-stabilising agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, and fire retardants, for example halogenated alkyl phosphates such as tris chloropropyl phosphate.

The polyol compositions of the present invention are suitable not only for preparing closed celled rigid polyurethane foam bull also for preparing open celled rigid polyurethane foam. The particular polyol compositions of the present invention are suitable for preparing open celled rigid polyurethane foam according to the process described in European Patent Application No 0498628. This process involves reacting a polyisocyanate composition with a polyol composition in the presence of an isocyanate-reactive cyclic carbonate (such as glycerol carbonate) or cyclic urea (such as Fixapret NF-available from BASF) as blowing promotor and in the presence of an inert insoluble fluorinated compound and a metal salt catalyst (such as Catalyst LB available from Imperial Chemical Industries PLC), optionally in the presence of very small amounts of tertiary amine catalysts.

Rigid foams may be prepared by reacting an organic polyisocyanate with an isocyanate-reactive material in the presence of a blowing promoter, characterized in that the isocyanate-reactive material comprises at least one isocyanate-reactive cyclic compound of formula:

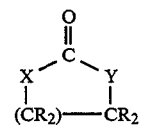

wherein Y is $-O-$ or $-NR^1-$ wherein each $R^1$, independently is a lower alkyl radical of $C_1-C_6$, or a lower alkyl radical substituted with an isocyanate-reactive group, wherein each R, independently is H, a lower alkyl radical of $C_1-C_6$, or $-(CH_2)_m-X$ wherein X is an isocyanate reactive group which is OH or $NH_2$, and m is 0, 1 or 2; and wherein n is 1 or 2 with the proviso that at least one of $R^1$ or R is or comprises an isocyanate-reactive group, the reaction being performed in the presence of an inert insoluble organic liquid which is present as the disperse phase of an emulsion or a microemulsion, and in the presence of a metal salt catalyst.

In operating the process for making rigid foams according to the invention, the known one-shot, prepolymer or semi-prepolymer techniques may be used together with conventional mixing methods and the rigid foam may be produced in the form of slabstock, mouldings, cavity fillings, sprayed foam, frothed foam or laminates with other materials such as hardboard, plasterboard, plastics, paper or metals.

As already described, the polyol compositions of the invention may be introduced directly into the foam reaction mixture, or they may be used as emulsion concentrates for admixture with one or more further polyol components, which may be the same as or different from the polyol or polyols comprised in the emulsion concentrate, and optionally with other standard components such as blowing agents, catalysts or surfactant materials, prior to reaction with the polyisocyanate component.

The polyol compositions according to the invention may be conveniently prepared by simple admixture of the components, preferably at the ambient temperature to avoid loss of volatile components by evaporation. Although high shear mixing techniques may optionally be employed, it has been found that simple stirring of the mixture is sufficient and leads to the formation of emulsions of excellent stability.

Certain of the surfactant compositions used for the preparation of the polyol compositions of the invention and the specific examples disclosed herein have not been previously described. In a further aspect, therefore, the invention provides the reaction product of a stoichiometric excess of a polyisocyanate and a polyalkylene glycol monoalkyl ether of formula R—A—OH, wherein R is $C_{8-22}$ alkyl (which may be straight or branched) and A is a polypropyleneoxy chain, having a total chain length of from 5 to 20 units.

The various aspects of this invention are illustrated but not limited by the following examples.

Example 1

Surfactant compositions were prepared according to the following general method. The polyalkylene glycol monoalkyl ether (dried under vacuum at 70°-90° C. to a water content of less than 0.05% where necessary) was added dropwise over a period of one hour to a polyisocyanate under a nitrogen atmosphere at 80° C. with constant stirring. Heating was continued at 80° C. for a further two hours to complete the reaction. The isocyanate value of the product was determined by titration with butylamine. The reactants and their relative amounts expressed as parts by weight (pbw), and the isocyanate values of the surfactant compositions are recorded in Table 1.

TABLE 1

| Surfactant Composition | Polyisocyanate (pbw) | Glycol monoether (pbw) | NCO Value of product |
|---|---|---|---|
| 1A | MDI - Pure 4,4'-isomer (64) | +Arlamol - E (36) | 19.2 |
| 1B | MDI - 60:40 Mixture of 2,4'- and 4,4'-isomers (64) | Arlamol - E (36) | 19.5 |
| 1C | Polymeric MDI - 13% polymeric content (60) | Arlamol - E (40) | 17.6 |
| 1D | Polymeric MDI - 33% polymeric content* (25) | Arlamol - E (75) | 6 |
| 1E | Polymeric MDI - 33% polymeric content* (50) | Arlamol - E (50) | 12.7 |
| 1F | Polymeric MDI - 33% polymeric content* (70) | Arlamol - E (30) | 19.7 |
| 1G | Polymeric MDI - 63% polymeric content* (72) | Arlamol - E (28) | 19.5 |

*The % polymeric content refers to that proportion of the polyisocyanate which has a molecular weight of >500, as determined by gel permeation chromatography.
+Arlamol - E is propoxylated stearyl alcohol containing an average of 10 propyleneoxy units, from Imperial Chemical Industries PLC.

Example 2

Polyol compositions in the form of emulsion concentrates were prepared according to the following general method. The surfactant composition (prepared according to the method of example 1 and identified in Table 2 by reference to Table 1) was added dropwise to a polyol or polyol mixture in a closed vessel at the ambient temperature under constant stirring at 600–700 rpm. Water was then added. After a homogeneous blend had been obtained, the insoluble fluorinated compound was added dropwise over 15 minutes. Stirring was continued for a further hour at 600–700 rpm. The stability of the resulting emulsion concentrate was determined by holding a sample in 100 cm3, cylindrical, glass vessels at 25° C. Settling of the emulsion was indicated by the appearance of an upper, separated layer. The extent of settling after 100 days was recorded as the height of this layer expressed as a percentage of the total height of the sample in the vessel. The composition and stability of emulsion concentrates prepared according to this method are recorded in Table 2. All component proportions are expressed in Table 2 as % by weight (% bw) of the total emulsion concentrate composition.

The stability of the emulsion concentrates was not improved by the use of high shear mixing methods.

A mixture of 60% bw Daltolac P180 and 40% bw FC75 prepared under similar conditions gave immediate separation. A mixture of 90% bw Daltolac P180 and 10% bw FC75 prepared under similar conditions gave an initial emulsion, but coalescence of droplets and the appearance of a lower, separated phase was observed after 4 hours.

TABLE 2

| Emulsion Concentrate | Polyol (% bw) | Surfactant Composition (% bw) | Water (% bw) | Insoluble fluorinated compound (% bw) | % Settlement after 100 days at 25° C. |
|---|---|---|---|---|---|
| 2A | Daltolac P180 (86) | 1F (2) | (2) | FC75 (10) | 78 |
| 2B | Daltolac P180 (83) | 1F (5) | (2) | FC75 (10) | 2.4 |
| 2C | Daltolac P180 (74) | 1F (4) | (2) | FC75 (20) | 49.6 |
| 2D | Daltolac P180 (73) | 1F (5) | (2) | FC75 (20) | 0 |
| 2E | Daltolac P180 (63) | 1F (5) | (2) | FC75 (30) | 30 |
| 2F | Daltolac P180 (60.5) | 1F (7.5) | (2) | FC75 (30) | 0 |
| 2G | Daltolac P180 (53) | 1F (5) | (2) | FC75 (40) | 5 |
| 2H | Daltolac P180 (50) | 1F (8) | (2) | FC75 (40) | 0 |

FC75: perfluorinated butyltetrahydrofuran, available from 3M under trade name Fluorad FC75
Daltolac P180: Sucrose-based polyol of hydroxy value 440, available from Imperial Chemical Industries PLC.

Example 3

Polyol compositions in the form of blends suitable for direct reaction with polyisocyanates for the preparation of polyurethane foam were prepared according to the following general method. Emulsion concentrates prepared according to the method of example 2 (identified in Table 3 by reference to Table 2) were diluted into base polyol systems comprising polyols, blowing agents and other additives for rigid polyurethane foam production. The compositions of the final polyol blends were chosen to give a final level of insoluble, fluorinated compound of 1 part by weight based on the total blend. For comparison, corresponding polyol blends were prepared containing an insoluble fluorinated compound at 1 part by weight in the absence of the surfactant composition according to the invention. The stabilities of the final polyol blends were determined after 5 days at room temperature according to the method described in Example 2. The compositions and stabilities of the blends are recorded in Table 3.

TABLE 3

| | Final Polyol Blends | | | | | | | | |
|---|---|---|---|---|---|---|---|---|---|
| | Reference | | | | | Invention | | | |
| Polyol A | 45 | 45 | 45 | 45 | 45 | 45 | 45 | 45 | 45 |

TABLE 3-continued

| | Final Polyol Blends | | | | | | | | |
|---|---|---|---|---|---|---|---|---|---|
| | Reference | | | Invention | | | | | |
| Daltolac P180 | 45 | 45 | 45 | 26.2 | 26.9 | 41.4 | 41.4 | 43.8 | 43.8 |
| Polyol B | 10 | 10 | 10 | 10 | 10 | 10 | 10 | 10 | 10 |
| SFC | 2.7 | 2.7 | 2.7 | 2.7 | 2.7 | 2.7 | 2.7 | 2.7 | 2.7 |
| Niax A1 | 0.1 | 0.1 | 0.1 | 0.1 | 0.1 | 0.1 | 0.1 | 0.1 | 0.1 |
| B8406 | 2.0 | 2.0 | 2.0 | 2.0 | 2.0 | 2.0 | 2.0 | 2.0 | 2.0 |
| Water | 2.0 | 2.0 | 2.0 | 1.6 | 1.6 | 1.9 | 1.9 | 1.9 | 1.9 |
| CFC-11 (blowing agent) | — | — | 35 | — | 35 | — | 35 | — | 35 |
| FC 430 | — | 1.0 | — | — | — | — | — | — | — |
| FC75 | 1.0 | 1.0 | 1.0 | — | — | — | — | — | — |
| Emulsion Concentrate 2D | — | — | — | — | — | 5 | 5 | — | — |
| Emulsion Concentrate 2H | — | — | — | — | — | — | — | 2.5 | 2.5 |
| Emulsion Concentrate * | — | — | — | 20 | 20 | — | — | — | — |
| Settlement after 5 days at 25° C. | ** | *** | ** | 4 | 10 | 5 | 13 | 7 | 14 |

\* Not in Table 2. Emulsion Concentrate comprising FC75 (5% bw), Surfactant Composition 1F (2.5% bw), Water (2% bw), Daltolac P180 (90.5% bw).
\*\* Total Coalescence of droplets leading to lower, separated phase.
\*\*\* Total Coalescence after 30 days storage at room temperature.

Polyol A is a polyester polyol of hydroxy value 347, derived from AGS acids, diethylene glycol and glycerol.

Polyol B is an amine/diethyleneglycol initiated polyether polyol of hydroxy value 440.

SFC is an amine catalyst from Imperial Chemical Industries PLC.

Niax A1 is an amine catalyst from Union Carbide.
B8406 is a silicone surfactant from Goldschmidt.
FC430 is a fluorosurfactant from 3M.

Example 4

Rigid polyurethane foams were prepared by reaction under standard conditions of polyol blends prepared according to the method of example 3 and a polyisocyanate component. The compositions were chosen to give a final level of insoluble fluorinated compound of 1 part by weight based on the total reaction system. The composition of the reactants and the thermal insulation properties of the foams are recorded in Table 4. Also included in Table 4 are details of foams prepared from the corresponding polyol blends in which standard surfactants are used in place of the surfactant compositions described herein. The results show no degradation of thermal insulation properties resulting from the use of the surfactant compositions according to the method of the invention.

TABLE 4

| Rigid Polyurethane Foams | | | | |
|---|---|---|---|---|
| Polyol A | 45 | 45 | 45 | 45 |
| Polyol B | 45 | 45 | 45 | 41 |
| Polyol C | 10 | 10 | 6 | 10 |
| SFC | 2.7 | 2.7 | 2.7 | 2.7 |
| Niax A1 | 0.1 | 0.1 | 0.1 | 0.1 |
| B8406 | 2 | 2 | 2 | 2 |
| Water | 2 | 2 | 1.9 | 1.9 |
| A-22 (blowing agent) | 35 | 35 | 35 | 35 |
| FC430 (fluorosurfactant from 3M) | 0.17 | 1.0 | — | — |
| FC75 (perfluorinated tetrahydrofuran from 3M) | 1.0 | 1.0 | — | — |
| Emulsion concentrate according to the invention | — | — | 5.27 [a] | 5.27 [b] |
| Polyisocyanate [c] | 159 | 159 | 159 | 159 |
| Lambda value (mW/m °K.) | | | | |
| initial | 17.9 | 18.0 | 18.4 | 18.4 |
| 1 week | 20.4 | 22.2 | 20.2 | 21.2 |
| 3 weeks | 23.5 | 24.3 | 23.9 | 23.9 |

[a] Emulsion Concentrate Comprising
FC75 19% bw
Water 1.9% bw
Surfactant Composition 1F 3.4% bw
Polyol A 75.5% bw
[b] Emulsion Concentrate Comprising
FC75 19% bw
Water 1.9% bw
Surfactant Composition 1F 3.4% bw
Daltolac P180 75.7% bw

Example 5

Surfactant compositions were prepared according to the general method described above in Example 1 by reacting 70 pbw of polyisocyanate SUPRASEC X2185 (available from Imperial Chemical Industries PLC) and 30 pbw of polyalkylene glycol monoalkyl ether R—A—OH where R is an alkyl group having n carbon atom and A is a polypropylenoxy chain of m units; n and m being defined in Table 5 below. Table 5 also lists the isocyanate value of the obtained product.

Polyol compositions were prepared according to the method described in Example 2 above containing 5 pbw of surfactant, 73 pbw of polyol Daltolac P180, 2 pbw of water and 20 pbw of fluorinated compound FC75.

The extent of settling after 30 days at room temperature was recorded and is listed in Table 5 below.

| Surfactant | n | m | NCO value | % settlement |
|---|---|---|---|---|
| 3A | 1 | 8,5 | 18,7 | 67,3 |
| 3B | 1 | 31 | 20,5 | 0 |
| 3C | 10 | 6 | 18,6 | 0 |
| 3D | 10 | 15 | 19,9 | 0 |
| 3E | 10 | 32 | 20,7 | ** |
| 3F | 18 | 10 | 19,7 | 0 |
| 3G | 18 | 20 | 20,1 | 0 |

\*\* prepolymer itself separates into two layers.

We claim:

1. Polyol composition comprising a polyol, an insoluble substantially fluorinated or perfluorinated compound and a surfactant composition, characterized in that the surfactant composition is the reaction product of a stoichiometric excess of a polyisocyanate and a polyoxyalkylene glycol monoalkyl ether of formula R—A—OH, wherein R is $C_{1-25}$ alkyl and A is a polypropyleneoxy chain, optionally containing up to 25% polyethyleneoxy units, having a total chain length of from 4 to 39 oxyalkylene units.

2. Polyol composition according to claim 1 further comprising from 0.5% to 5% water.

3. Polyol composition according to claim 1 wherein the polyisocyanate is a mixture of diphenylmethane diisocyanates and oligomers thereof having an isocyanate functionality of greater than 2.

4. Polyol composition according to claim 1 wherein the insoluble fluorinated compound is a substantially fluorinated or perfluorinated hydrocarbon, a substantially fluorinated or perfluorinated ether, a substantially fluorinated or perfluorinated tertiary amine, a substantially fluorinated or perfluorinated amino-ether or a substantially fluorinated or perfluorinated sulphone.

5. Polyol composition according to claim 1 wherein the surfactant composition has an isocyanate value in the range from 5 to 30.

6. Polyol composition according to claim 1 wherein the sum of the number of carbon atoms in the alkyl chain of R and the number of oxyalkylene units of the polypropylenoxy chain of A is between 5 and 40.

7. Polyol composition according to claim 1 wherein R is $C_{8-22}$ alkyl.

8. Polyol composition according to claim 1 wherein A is a polypropyleneoxy chain containing from 5 to 20 propyleneoxy units.

9. Polyol composition according to claim 1 comprising from 0.1% to 60% by weight of the insoluble fluorinated compound and from 0.05% to 20% by weight of the surfactant composition.

10. Polyol composition according to claim 1 in the form of an emulsion concentrate comprising from 5% to 60% by weight of the insoluble fluorinated compound and from 0.25% to 20% by weight of the surfactant composition.

11. Polyol composition according to claim 1 further comprising a blowing agent, a catalyst or an additional surfactant material.

12. Polyol composition according to claim 11 wherein the blowing agent comprises an isocyanate-reactive cyclic carbonate or an isocyanate-reactive cyclic urea and wherein the catalyst comprises a metal salt.

13. Process for the preparation of a polyol composition according to claim 1 which comprises admixture of a polyol, an insoluble substantially fluorinated or perfluorinated compound and a surfactant composition which comprises the reaction product of a stoichiometric excess of a polyisocyanate and a polyalkylene glycol monoalkyl ether of formula R—A—OH, wherein R is $C_{1-25}$ alkyl and A is a polypropyleneoxy chain, optionally containing up to 25% polyethyleneoxy units, having a total chain length of from 4 to 39 oxyalkylene units.

14. Process for tile preparation of a polyol composition according to claim 1 in the form of an emulsion concentrate which comprises and admixture of a polyol, from 5 to 60% by weight of an insoluble substantially fluorinated of perfluorinated compound and from 0.25 to 20% by weight of a surfactant composition which comprises the reaction product of a stoichiometric excess of a polyisocyanate and a polyoxyalkylene glycol monoalkyl ether of formula R—A—OH, wherein R is $C_{1-25}$ alkyl and A is a polypropyleneoxy chain, optionally containing up to 25% polyethyleneoxy units, having a total chain length of from 4 to 39 oxyalkylene units.

* * * * *

UNITED STATES PATENT AND TRADEMARK OFFICE
CERTIFICATE OF CORRECTION

PATENT NO. : 5,428,104
DATED      : June 27, 1995
INVENTOR(S) : Barker et al.

It is certified that error appears in the above-indentified patent and that said Letters Patent is hereby corrected as shown below:

On the Title page, insert the following information:

[30]  Foreign Application Priority Data
          Nov. 27, 1992 [GB] United Kingdom 9224910

Signed and Sealed this

Twenty-first Day of November, 1995

Attest:

BRUCE LEHMAN

*Attesting Officer*      *Commissioner of Patents and Trademarks*